(12) United States Patent
Gauthier

(10) Patent No.: US 9,590,555 B2
(45) Date of Patent: Mar. 7, 2017

(54) STRUCTURE OF VARIABLE LIGHT DISPLAY FOR VEHICLE TRAFFIC LANE(S) ELECTRICALLY POWER SUPPLIED BY PHOTOVOLTAIC PANELS

(71) Applicant: AXIMUM, Magny les Hameaux (FR)

(72) Inventor: Franck Gauthier, Mettray (FR)

(73) Assignee: AXIMUM, Magny les Hameaux (FR)

( * ) Notice: Subject to any disclaimer, the term of this patent is extended or adjusted under 35 U.S.C. 154(b) by 0 days.

(21) Appl. No.: 14/823,468

(22) Filed: Aug. 11, 2015

(65) Prior Publication Data

US 2016/0049899 A1 Feb. 18, 2016

(30) Foreign Application Priority Data

Aug. 12, 2014 (FR) ...................................... 14 57769

(51) Int. Cl.
  *E01F 9/011* (2006.01)
  *F03G 6/00* (2006.01)
  (Continued)

(52) U.S. Cl.
  CPC .............. *H02S 20/21* (2014.12); *E01F 9/696* (2016.02); *E04B 1/3404* (2013.01); *F24J 2/00* (2013.01);
  (Continued)

(58) Field of Classification Search
  CPC ........... E04B 1/3404; G09F 2013/0445; G09F 2013/0472; G09F 19/22; G09F 27/007; H02S 20/21
  See application file for complete search history.

(56) References Cited

U.S. PATENT DOCUMENTS 5,008,967 A    4/1991  Barrios et al.
7,716,861 B2 *  5/2010  Stadjuhar, Jr. ............ G09F 9/00
                                                    340/944
(Continued)

FOREIGN PATENT DOCUMENTS

CA    2470279 A1 *  5/2005  ............ E01F 9/0113
CN   202530392 U     11/2012
(Continued)

OTHER PUBLICATIONS

FR Search Report, dated Apr. 27, 2015, from corresponding FR application.

*Primary Examiner* — Christine T Cajilig
(74) *Attorney, Agent, or Firm* — Young & Thompson

(57) ABSTRACT

The structure (10) of light display for vehicle traffic lane(s) is of the type including at least one vertical support post (7), a substantially horizontal crossbar (3) fixed high to said at least one support post (7) and a variable-message light display panel (2) fixed to said crossbar, said display panel (2) having a front face on which the light messages are broadcast, and a rear face, said display panel being elongated along the crossbar (3), parallel and fixed to the latter, said structure including an autonomous electric power supply source comprising at least one photovoltaic panel (1). The photovoltaic panel(s) (1) are arranged towards the top and the rear of the display panel (2), in a plane that is horizontal or, preferably, inclined but not vertical, carried by a horizontal line parallel to the crossbar (3) and to the display panel (2), the front end(s) of the photovoltaic panels (1) being placed substantially against the upper end of the display panel (2), the front end(s) of the photovoltaic panels (1) being higher than the rear end(s) (12) of said photovoltaic panel(s) in the case of inclined photovoltaic panels.

18 Claims, 3 Drawing Sheets

(51) Int. Cl.
*G09F 13/20* (2006.01)
*H02S 20/21* (2014.01)
*H02S 20/22* (2014.01)
*E04B 1/34* (2006.01)
*F24J 2/00* (2014.01)
*H02S 10/12* (2014.01)

(52) U.S. Cl.
CPC .............. *H02S 10/12* (2014.12); *H02S 20/22* (2014.12); *Y02B 10/10* (2013.01)

(56) References Cited

U.S. PATENT DOCUMENTS

| | | | | |
|---|---|---|---|---|
| 8,429,841 | B1* | 4/2013 | Keller | G09F 27/007 40/612 |
| 9,068,305 | B2* | 6/2015 | Cardoso | E01F 9/0113 |
| 9,121,391 | B1* | 9/2015 | Koehler, III | F03G 6/00 |
| 2003/0103345 | A1* | 6/2003 | Nolan | G09F 13/04 362/157 |
| 2004/0075618 | A1* | 4/2004 | Kohan | G09F 19/22 345/1.1 |
| 2007/0209254 | A1* | 9/2007 | Perlo | G09F 19/22 40/541 |
| 2008/0155869 | A1* | 7/2008 | Golle | G09F 13/22 40/544 |
| 2013/0076294 | A1* | 3/2013 | Smith | H01M 10/465 320/101 |
| 2014/0290103 | A1* | 10/2014 | Kyberd | G08B 5/28 40/466 |

FOREIGN PATENT DOCUMENTS

| | | | | |
|---|---|---|---|---|
| CN | 103122613 A | | 5/2013 | |
| DE | 102014103610 A1 | * | 9/2015 | .......... G09F 27/007 |
| EP | 1502999 A1 | | 2/2005 | |
| EP | 2393079 A1 | | 12/2011 | |
| ES | 1075234 U | | 8/2011 | |
| WO | WO 2011140557 A1 | * | 11/2011 | ............. E04H 6/025 |

\* cited by examiner

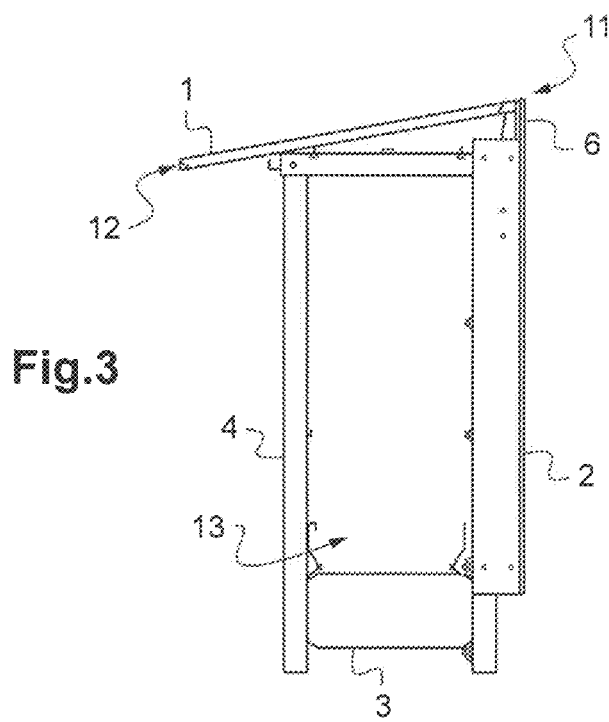
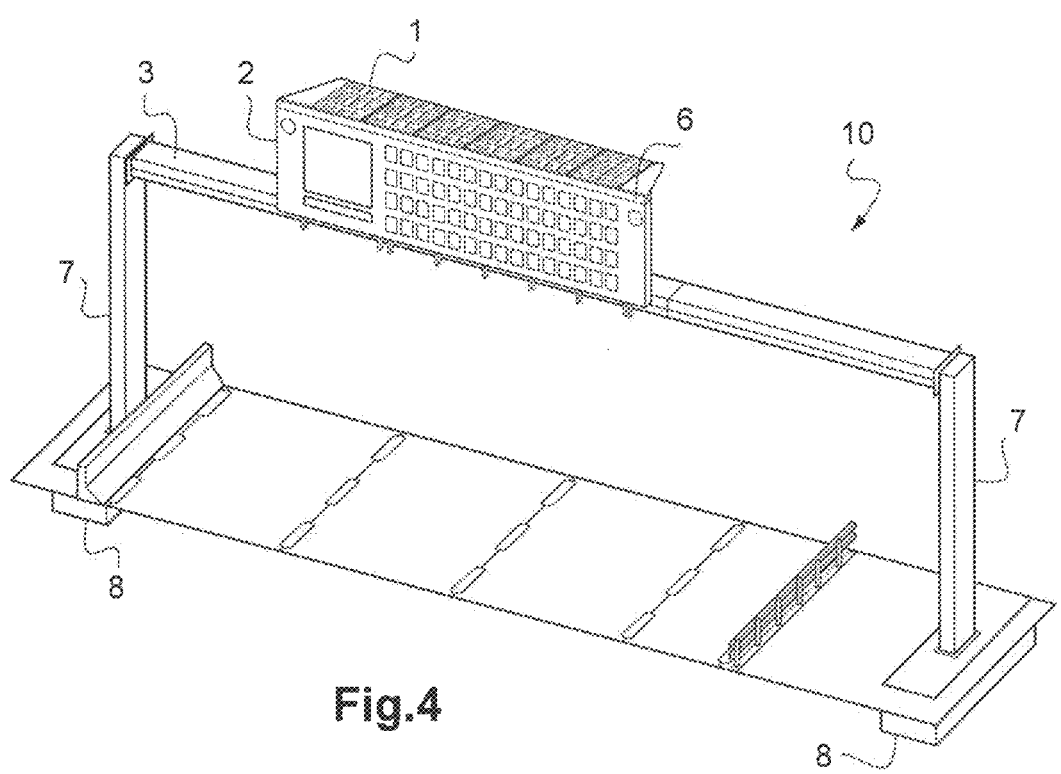

STRUCTURE OF VARIABLE LIGHT DISPLAY FOR VEHICLE TRAFFIC LANE(S) ELECTRICALLY POWER SUPPLIED BY PHOTOVOLTAIC PANELS

FIELD OF THE INVENTION

The present invention relates to a structure of variable-message light display for vehicle traffic lane(s), which is electrically power supplied by at least one photovoltaic panel. It has essentially applications in the field of building and maintaining of roads and highways for the broadcasting of messages regarding the motorist driving and traffic. It can however find applications in the field of advertisement, in which advertisement messages can be broadcast above or along traffic lanes or parks or other sites where public can be found.

BACKGROUND OF THE INVENTION

Portals or overhead signposts for variable light displays are now widely used along or above the vehicle traffic lanes. To be visible from a long way by the motorists, these structures include at least one vertical support post and a horizontal crossbar supporting a variable-message light display panel arranged high up. Within the context of the invention, the term "structure" must be understood as corresponding to a carrier structure for a variable light display with one, two or more support posts. For a portal above traffic lanes, two posts are erected, on either side of the lanes, to support the light display panel extended transversally above the lanes. An overhead signpost arranged laterally to the lanes includes only one support post. The light display panel is in all the cases electrically power supplied.

Such structures may be arranged at any place and in particular in rural or even desert areas, where the electric power grid is not always established. It has hence been proposed to implement autonomous electric power supply sources, as for example wind turbine or photovoltaic panels.

In practice, the photovoltaic panels are mechanically fixed to the structure. In order to have an optimum efficiency, the photovoltaic panels, which are fixed, are placed so as to be directed towards a zone of the sky where, in average, the solar luminosity is the highest. It results therefrom that, at other latitudes than the equator, the photovoltaic panels must have a relatively significant inclination. In practice, the photovoltaic panels are directed towards the south according to a practically vertical axis.

This leads to two consequences. On the one hand, the photovoltaic panels have hence a significant surface area, possibly cantilevered, and are subjected to wind, which generates high mechanical stresses to the structure and to the ground anchoring concrete pedestals. In order to support these additional forces, the structure elements and the concrete pedestals must be oversized.

On the other hand, the photovoltaic panels also have a surface visible by people on the ground that is relatively significant. Consequently, these photovoltaic panels are in practice very visible by the public and might arouse interest of ill-intentioned people: theft, gunshot.

The device according to the invention proposes a solution that allows to remedy these drawbacks. In its principle, the invention consists in placing the photovoltaic panels on the top and the rear of the light display panel, horizontally or, preferably, with a slight inclination towards the rear and the bottom along an orientation that is hence independent of the zone of the sky where the solar luminosity is the highest. The slight inclination allows to avoid that wastes easily accumulate on the photovoltaic panels. The photovoltaic panels are then masked from the view of people on the ground by the light display panel. Moreover, they are positioned in an area in which they are practically in the plane of the portal post(s), which limits the cantilever. Their wind surface area is further reduced due to their low inclination and to the presence of the light display panel in front of them.

Structures of light display with photovoltaic panels are known from the documents CN103122613A, CN202530392U, ES1075234U. The documents EP1502999A1, U.S. Pat. No. 5,008,967A disclose portals, in particular for displays, with a catwalk open to the environment.

SUMMARY OF THE INVENTION

Hence, the invention relates to a structure of light display for vehicle traffic lane(s) of the type including at least one vertical support post, a substantially horizontal crossbar fixed high to said at least one support post and a variable-message light display panel fixed to said crossbar, said display panel having a substantially vertical front face, parallel to the crossbar, on which the light messages are broadcast, and a rear face, said display panel being elongated along the crossbar, parallel and fixed to the latter, said structure including an autonomous electric power supply source comprising at least one photovoltaic panel.

According to the invention, said at least one photovoltaic panel is arranged on the top and the rear of the display panel, and has a useful external face that extends in a horizontal or inclined but non vertical plane, parallel to the crossbar.

In various embodiments of the invention, the following means, which can be used alone or in any technically possible combination, are used:
  the front end of the photovoltaic panel is placed substantially against the upper end of the display panel,
  the photovoltaic panels are aligned side-by-side along the rear of the display panel,
  the rear face of the light display panel allows access to internal devices of the display panel,
  the light display panel is a display remote control,
  the remote control is based on radio waves,
  the remote control is based on infrared waves,
  the remote control is wire-based,
  the remote control is based on fiber optic,
  the structure further includes a wind turbine electric power supply source,
  the front end(s) of the photovoltaic panels are placed substantially against the rear face of the upper end of the display panel,
  the front end(s) of the photovoltaic panels are placed substantially against the rear face of the upper end of a contrast screen of the display panel,
  the crossbar includes a footbridge on which personnel can walk and accede to the rear face of the display panel, and the platform is bordered on the rear by an anti-fall guard rail including substantially vertical struts and said struts serve as a support for a rear part of the photovoltaic panel, the front part of the photovoltaic panel being held by the display panel and/or by substantially vertical supports integral with the crossbar and intended to support the display panel,
  the photovoltaic panel(s) are horizontal,
  the photovoltaic panel(s) are inclined from the top front to the bottom rear, the photovoltaic panel(s) are either horizontal, or inclined from the top front to the bottom rear according to an angle comprised between 0° excluded and 45° with respect to a horizontal plane, the horizontality or the inclination of the photovoltaic panel(s) is adjustable, the horizontality or the inclination of the photovoltaic panel(s) is adjustable for each of the photovoltaic panels, the photovoltaic panel(s) are horizontal or inclined from the top front to the bottom rear according to an angle comprised between 0° excluded and 22.5° with respect to a horizontal plane, preferably, the photovoltaic panel(s) are inclined from the top front to the bottom rear according to an angle comprised between 0° and 12° with respect to a horizontal plane, the photovoltaic panel(s) is/are inclined from the top front to the bottom rear according to an angle comprised between 5° and 45° with respect to a horizontal plane, said at least one photovoltaic panel forms a cover for the footbridge, the photovoltaic panels are in continuity with each other and form a cover for the footbridge, the display panel includes two lateral ends and said at least one photovoltaic panel is extended on the rear of the display panel so as not to protrude laterally from said lateral ends, said at least one photovoltaic panel ends laterally remote from a lateral end of the display panel, and a lateral cover plate is arranged in the plane of photovoltaic panels to fill the space between the end panel and the corresponding lateral end of the display panel, the structure is of a first type with a single support post or of a second type with two support posts, the crossbar being supported at each of its two lateral ends by one of the two support posts for the second type, the support post is a single-column post, the support post is composite, formed of an assembly of posts, the support post is anchored to the ground on or in a concrete pedestal, the structure is essentially metallic and consisted of metal plates and tubes fixed to each other, the display panel and said at least one photovoltaic panel are placed along the crossbar, so as to equilibrate the load added by said display panel and said at least one photovoltaic panel with respect to said at least one support post, the structure includes a single support post supporting medianly the crossbar, the display panel and said at least one photovoltaic panel, the structure includes a single support post supporting medianly the crossbar and the display panel and the photovoltaic panel(s) are arranged in an equal/equilibrated manner on either side of the support post, the light display panel includes at the periphery of its front face, at least on the top, an area of visual contrast also called "contrast screen", the area of visual contrast has a horizontal upper edge to which is fixed said at least one photovoltaic panel, the display panel further includes towards the top and the front a sunshade extending on the front of said display panel and possibly laterally to the latter, the sunshade, in its region at the top of the display panel, is inclined from the top rear to the bottom front, the sunshade, in its region at the top of the display panel, is formed of or includes photovoltaic panels, said photovoltaic panels having dimensions adapted to their sunshade function.

BRIEF DESCRIPTION OF THE DRAWINGS

The present invention will now be exemplified, without being limited thereby, by the following description in relation with the following figures.

DETAILED DESCRIPTION OF THE INVENTION

In its principle, the light display structure for vehicle traffic lane(s) includes at least one vertical support post, a substantially horizontal crossbar fixed high to said at least one support post and a variable-message light display panel fixed to the said crossbar, said display panel, substantially parallelepipedal in shape and of relatively reduced thickness, having a front face on which the light messages are broadcast, and a rear face, said display panel being elongated along the crossbar, parallel and fixed to the latter, said structure including an autonomous electric power supply source comprising at least one photovoltaic panel.

The light display structure has the particularity that the photovoltaic panel(s) are arranged towards the top and the rear of the display panel, in a plane that is horizontal or, preferably, inclined but not vertical, carried by a horizontal line parallel to the crossbar and to the display panel, the front end(s) of the photovoltaic panels being placed substantially against the upper end of the display panel, the front end(s) of the photovoltaic panels being higher than the rear end(s) of said photovoltaic panel(s) in the case of inclined photovoltaic panels.

Figure 1:
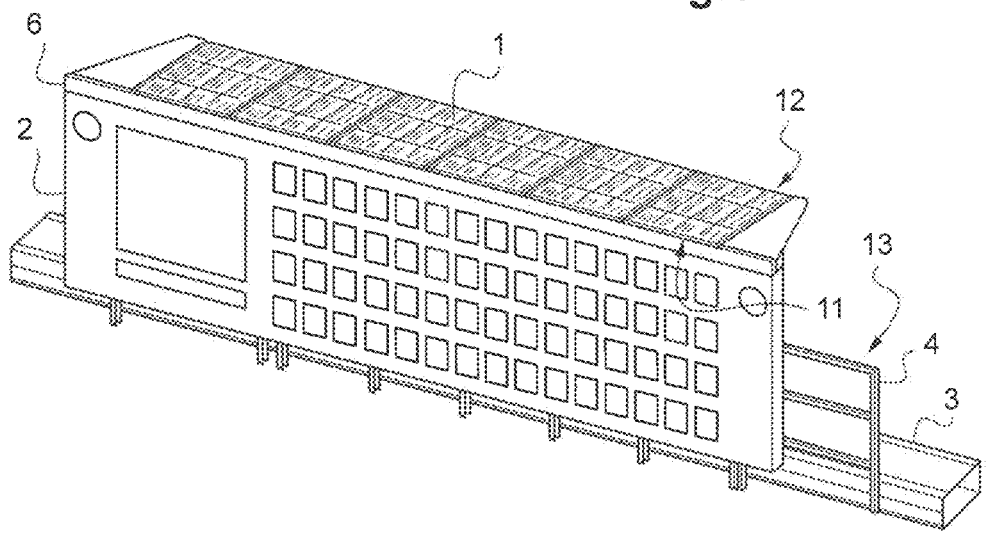
FIG. 1, which shows in a front view the arrangement of the photovoltaic panels installed on a variable-message light panel, FIG. 2, which shows in a rear view the arrangement of the photovoltaic panels installed on a variable-message light panel, FIG. 3, which shows in a side view the arrangement of the photovoltaic panels installed on a variable-message light panel, FIG. 4, which shows a variable-message light panel equipped with photovoltaic panels according to the present invention and installed on its carrier structure and its concrete pedestals, and FIG. 5 schematically shows a sunshade and single column post.
Figure 2:
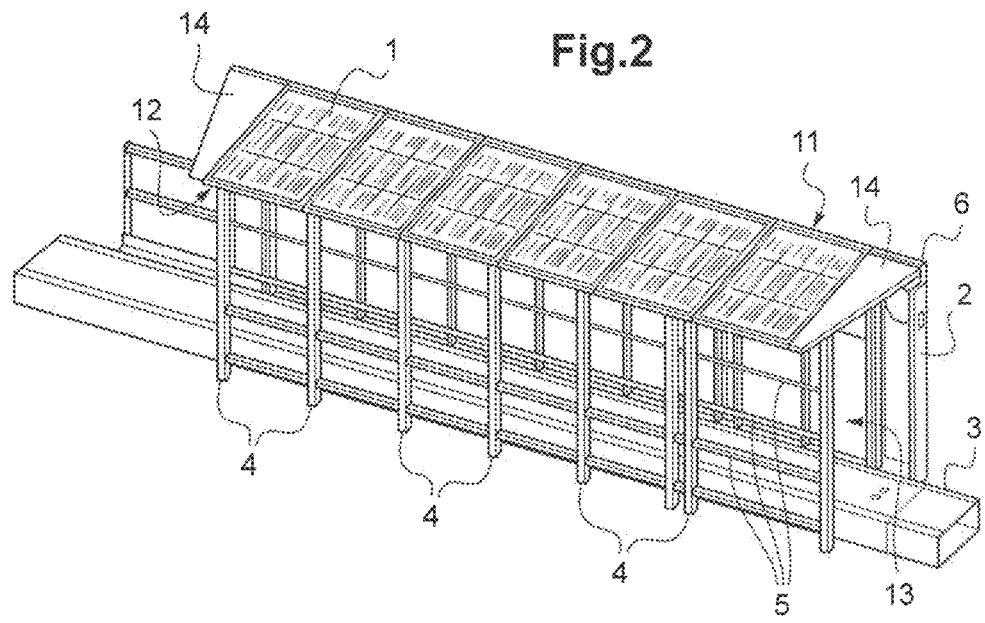

Hence, in FIG. 1, in which only the high elements of the structure have been shown, a crossbar 3 can be seen, on the front of which a light display panel 2 is fixed through vertical supports. A footbridge 13 on which personnel can walk and accede to the rear face of the display panel 2 is arranged on the crossbar 3 and it can be noted the presence of a guard rail bordering said footbridge on the sides thereof. The rear guard rail of the footbridge 13 is better visible in FIG. 2, with its struts 4. The photovoltaic panels 1 are fixed to the upper part and towards the rear of the variable-message light panel 2 and to the crossbar 3 via the small struts 4 and the small crossbars 5 of the rear guard rail.

It is to be noted that the qualifiers "front" and "rear" and their equivalents are defined with respect to the display panel that has a display face considered as a front face by opposition to its rear face. It is also to be noted that, when it is indicated that the front end(s) or part(s) of the photovoltaic panels are placed substantially against the upper end of the display panel, it does not necessarily means that it is a flush mounting. That way, the front end or part 11 of the photovoltaic panels may be installed and fixed both on the upper edge of the display panel or against the rear face of this upper edge. The different possibilities of mounting of the panels on the top and towards the rear of the display panel depend in particular on the fixation means implemented: directly on the display panel or not and/or on struts serving to the fixation of the display panel to the crossbar. For example, in the case of a display panel including an area of optical contrast on the top of its front face, the photovoltaic panels may be in practice mounted against the rear of the top of this contrast area. These mounting possibilities may also depend on the fact that there may be access doors that must be able to be open on the rear face of the display panel to accede to the inside of the display panel and to repair it.

The apparent surface of the photovoltaic panels is partially or fully masked by a planar device 6 installed in the upper continuation of the front face of the variable-message light panel. This planar surface 6, called "contrast screen", is generally present on most of the variable-message light panels. Its initial role is to form a contrast screen or contrast area optimizing the readability of the messages displayed. Its surface is taken into account in the total surface of the variable-message light panel. The presence of the photovoltaic panels installed according to the invention generates no or a little additional wind surface area. Moreover, from the point of view of the user, this arrangement makes the photovoltaic panels almost invisible.

The lateral ends of the photovoltaic panels are continued on each side by a lateral cover plate 14 that is arranged in the plane of the photovoltaic panels to fill the space between the end panel and the corresponding lateral end of the display panel. The photovoltaic panels 1 and the lateral cover plates 14 form a cover for the footbridge 13 that allows to protect the personnel and the rear of the display panel from bad weather.

The photovoltaic panels 1 are arranged substantially horizontally as shown in FIG. 3, in practice and preferably with a slight inclination, so as to reduce at the maximum the visible surface that undergoes the effect of wind. The photovoltaic panels are mechanically connected to the variable-message light panel 2 in the upper part thereof. The main axis of each photovoltaic panel 1, which is generally rectangular in shape, may be oriented parallel or perpendicular to the main axis of the crossbar 3, as shown in the embodiment of FIG. 1.

The elements of the structure shown in its two-post form in FIG. 4, in particular the crossbar 3 and the support posts 7, have not to be oversized to take into account the addition of the photovoltaic panels 1, likewise for the concrete pedestals 8 for anchoring the structure to the ground.

Figure 5:
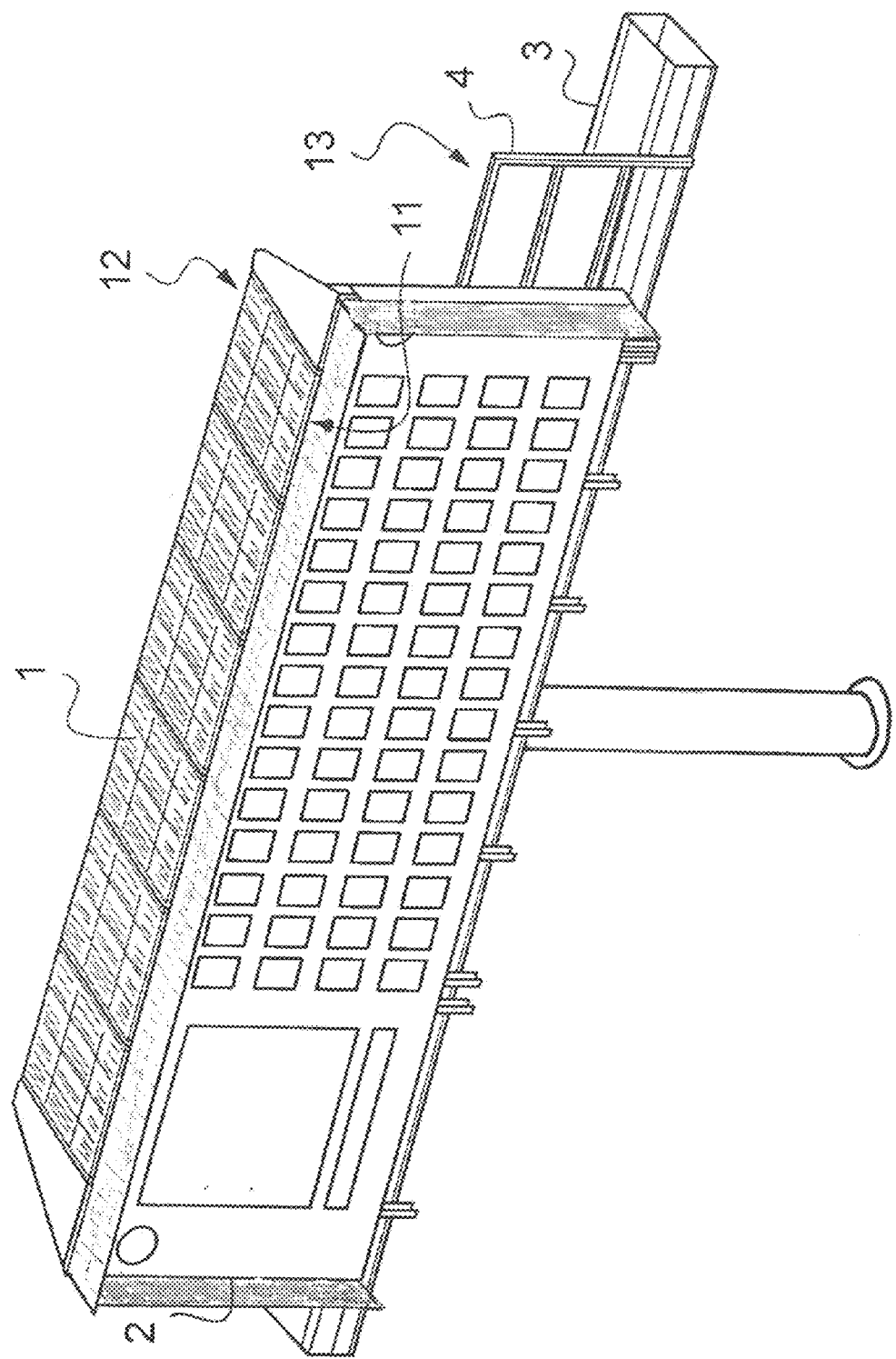

FIG. 5, which schematically shows in a front view another embodiment of the variable-message light panel with photovoltaic panels and that is arranged on a single-column post, a sunshade extending on the front of said display panel.

More generally, the principle on which the invention is based applies to any type of light panels power supplied by means of photovoltaic panels. This principle applies to various embodiments such as the mounting on a carrier structure with two support posts (cf. FIGS. 1 to 4) as well as to embodiments based on carrier structures with one support post such as an overhead signpost or a mast. In some variants, it is provided that the photovoltaic panels are inclined with a reverse inclination with respect to that of the Figures, i.e. their front ends are lower than their rear ends.

In such a case, a drain water harvesting means is provided in front of the photovoltaic panels and/or, if necessary, a means for reinforcing the tightness of the display panel is provided. With such an orientation, the panels remain hidden by the contrast area if they are placed on the rear and the bottom of the latter.

The invention claimed is:

1. A structure (10) of light display for vehicle traffic lane(s) of the type including at least one vertical support post (7), a substantially horizontal crossbar (3) fixed high to said at least one support post (7) and a variable-message light display panel (2) fixed to said crossbar, said display panel (2) having a substantially vertical front face, parallel to the crossbar (3), on which the light messages are broadcast, and a rear face, said display panel being elongated along the crossbar (3), parallel and fixed to the latter, said structure including an autonomous electric power supply source comprising at least one photovoltaic panel (1), said at least one photovoltaic panel (1) being arranged on the top and the rear of the display panel (2) and having a useful external face that extends in a horizontal or inclined but non vertical plane, parallel to the crossbar (3), wherein the crossbar (3) includes a footbridge (13) on which personnel can walk and accede to the rear face of the display panel (2), and the platform (13) is bordered on the rear by an anti-fall guard rail including substantially vertical struts (4) and said struts serve as a support for a rear part (12) of the photovoltaic panel (1), the front part (11) of the photovoltaic panel (1) being held by the display panel (2) and/or by substantially vertical supports integral with the crossbar (3) and intended to support the display panel (2), wherein the display panel (2) includes two lateral ends and in that said at least one photovoltaic panel (1) is extended on the rear of the display panel so as not to protrude laterally from said lateral ends, and wherein said at least one photovoltaic panel (1) ends laterally remote from a lateral end of the display panel (2), and in that a lateral cover plate (14) is arranged in the plane of photovoltaic panels to fill the space between the end panel (1) and the corresponding lateral end of the display panel (2).

2. The structure according to claim 1, wherein said at least one photovoltaic panel (1) forms a cover for the footbridge (13).

3. The structure according to claim 1, wherein the front end of the photovoltaic panel (1) is placed substantially against the upper end of the display panel (2).

4. The structure according to claim 1, wherein the photovoltaic panel(s) (1) are inclined from the top front to the bottom rear according to an angle comprised between 0° and no more than 45° with respect to a horizontal plane.

5. The structure according to claim 1, wherein the display panel and said at least one photovoltaic panel are placed along the crossbar so as to equilibrate the load added by said display panel and said at least one photovoltaic panels with respect to said at least one support post.

6. The structure according to claim 5, further comprising a single support post supporting medianly the crossbar, the display panel and said at least one photovoltaic panel.

7. The structure according to claim 1, wherein the light display panel includes at the periphery of its front face, at least on the top, an area of visual contrast (6) having a horizontal upper edge adjacent to the front end of the photovoltaic panel (1).

8. The structure according to claim 1, wherein the display panel further includes towards the top and the front a sunshade extending on the front of said display panel, and the sunshade, in its region at the top of the display panel, is formed of or includes photovoltaic panels, said photovoltaic panels having dimensions adapted to their sunshade function.

9. A structure (10) of light display for vehicle traffic lane(s) of the type including at least one vertical support post (7), a substantially horizontal crossbar (3) fixed high to said at least one support post (7) and a variable-message light display panel (2) fixed to said crossbar, said display panel (2) having a substantially vertical front face, parallel to the crossbar (3), on which the light messages are broadcast, and a rear face, said display panel being elongated along the crossbar (3), parallel and fixed to the latter, said structure including an autonomous electric power supply source comprising at least one photovoltaic panel (1), said at least one photovoltaic panel (1) being arranged on the top and the rear of the display panel (2) and having a useful external face that extends in a horizontal or inclined but non vertical plane, parallel to the crossbar (3), wherein the crossbar (3) includes a footbridge (13) on which personnel can walk and accede to the rear face of the display panel (2), and the footbridge (13) is bordered on the rear by an anti-fall guard rail including substantially vertical struts (4) and said struts serve as a support for a rear part (12) of the photovoltaic panel (1), the front part (11) of the photovoltaic panel (1) being held by the display panel (2) and/or by substantially vertical supports integral with the crossbar (3) and intended to support the display panel (2), said at least one photovoltaic panel (1) forming a cover for the footbridge (13), wherein the front end of the photovoltaic panel (1) is placed substantially against the upper end of the display panel (2).

10. The structure according to claim 9, wherein the photovoltaic panel(s) (1) are inclined from the top front to the bottom rear according to an angle between 0° and no more than 45° with respect to a horizontal plane.

11. The structure according to claim 9, wherein the display panel (2) includes two lateral ends and in that said at least one photovoltaic panel (1) is extended on the rear of the display panel so as not to protrude laterally from said lateral ends.

12. The structure according to claim 11, wherein said at least one photovoltaic panel (1) ends laterally remote from a lateral end of the display panel (2), and in that a lateral cover plate (14) is arranged in the plane of photovoltaic panels to fill the space between the end panel (1) and the corresponding lateral end of the display panel (2).

13. The structure according to claim 9, wherein the display panel and said at least one photovoltaic panel are placed along the crossbar so as to equilibrate the load added by said display panel and said at least one photovoltaic panels with respect to said at least one support post.

14. The structure according to claim 13, further comprising a single support post supporting medially the crossbar, the display panel and said at least one photovoltaic panel.

15. The structure according to claim 9, wherein the light display panel includes at the periphery of its front face, at least on the top, an area of visual contrast (6) having a horizontal upper edge adjacent to the front end of the photovoltaic panel (1).

16. The structure according to claim 9, wherein the display panel further includes towards the top and the front a sunshade extending on the front of said display panel and laterally to the latter, and the sunshade, in its region at the top of the display panel, is formed of or includes photovoltaic panels, said photovoltaic panels having dimensions adapted to their sunshade function.

17. The structure according to claim 16, wherein the display panel further includes a sunshade extending laterally on the front of the display panel.

18. The structure according to claim 9, wherein the display panel further includes towards the top and the front a sunshade extending on the front of said display panel and the sunshade, in its region at the top of the display panel, is formed of or includes photovoltaic panels, said photovoltaic panels having dimensions adapted to their sunshade function.

* * * * *